United States Patent [19]
Blough et al.

[11] Patent Number: 5,951,867
[45] Date of Patent: Sep. 14, 1999

[54] METHOD FOR VACUUM AERATION OF SEPTIC TANKS TO PROVIDE LOW PRESSURE MICROBUBBLES

[75] Inventors: Ronald S. Blough, Fairfield; Jerard B. Hoage; Larry A. Messer, both of Lockridge, all of Iowa

[73] Assignee: Sewage Aeration System Systems, Inc., Lockridge, Iowa

[21] Appl. No.: 07/996,968

[22] Filed: Dec. 23, 1992

Related U.S. Application Data

[60] Continuation-in-part of application No. 07/969,001, Oct. 30, 1992, abandoned, which is a division of application No. 07/687,373, Apr. 18, 1991, Pat. No. 5,194,144.

[51] Int. Cl.⁶ .................................................. C02F 11/02
[52] U.S. Cl. .............................. 210/620; 210/532.2
[58] Field of Search ................................ 210/620, 219, 210/532.2; 261/77, 84, 93, 121.1

[56] References Cited

U.S. PATENT DOCUMENTS

| | | | |
|---|---|---|---|
| 3,677,229 | 7/1972 | Blough et al. | 119/16 |
| 3,778,233 | 12/1973 | Blough et al. | 23/259.1 |
| 3,796,414 | 3/1974 | Winton | 261/84 |
| 3,810,548 | 5/1974 | Blough | 210/242 |
| 3,939,073 | 2/1976 | Bats | 210/219 |
| 4,608,157 | 8/1986 | Graves | 210/532.2 |
| 4,686,045 | 8/1987 | McKee | 210/532.2 |
| 4,732,682 | 3/1988 | Rymal | 210/219 |
| 4,954,295 | 9/1990 | Durda | 261/93 |
| 5,194,144 | 3/1993 | Blough | 210/85 |

*Primary Examiner*—Thomas G. Wyse
*Attorney, Agent, or Firm*—Zarley, McKee, Thomte, Voorhees & Sease

[57] ABSTRACT

An improved method for aeration of septic tanks and the like by drawing atmospheric air into an expansion chamber and from there into agitated sludge to provide low pressure small microbubbles which have long hold times in the sludge material.

4 Claims, 1 Drawing Sheet

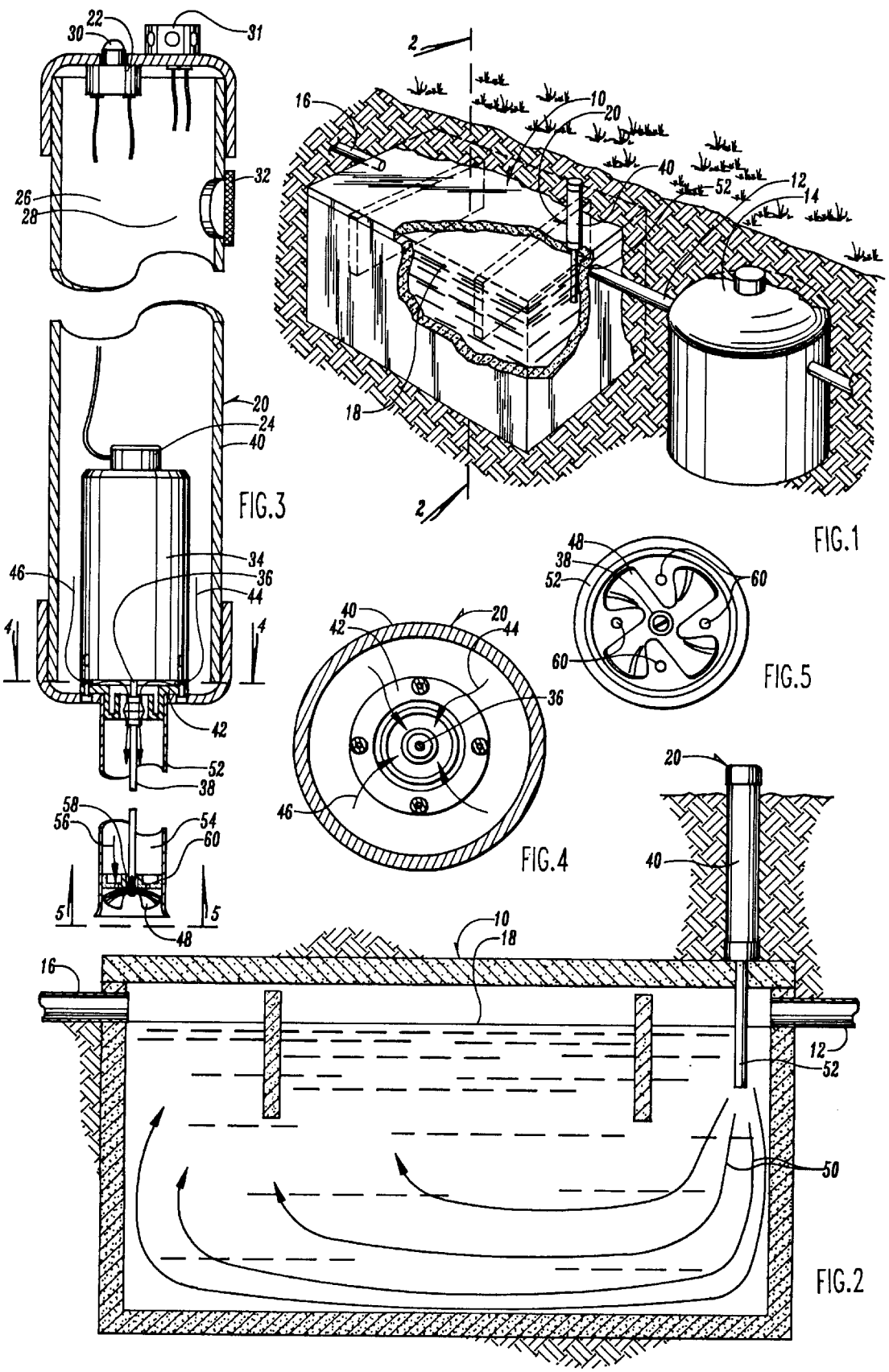

METHOD FOR VACUUM AERATION OF SEPTIC TANKS TO PROVIDE LOW PRESSURE MICROBUBBLES

CROSS REFERENCED TO A RELATED APPLICATION

This application is a continuation-in-part of Ser. No. 07/969,001, filed Oct. 30, 1992, now abandoned, which is a division of Ser. No. 07/687,373, filed Apr. 18, 1991 now U.S. Pat. No. 5,194,144.

BACKGROUND OF THE INVENTION

This invention generally relates to a method for improved aeration for septic tanks and the like.

Bacterial breakdown of sewage waste material is essentially performed by one of two basic processes, namely an aerobic process and an anaerobic process. The aerobic process requires oxygen for the bacteria to survive and successfully decompose waste material. Emphasis upon the aerobic action, as opposed to anaerobic bacterial action is preferred because aerobic bacteria decompose waste materials often without objectionable odors or the formation of objectionable gases. Aerobic bacteria need a constant supply of oxygen on which to thrive, and therefore, such aerobic systems require continuous replenishment of dissolved oxygen consumed by the aerobes in the waste material. Additionally, agitation is necessary to prohibit waste particles from settling out to resist bacterial decomposition and form a continual buildup of sludge in septic tanks and the like.

These requirements of aerobic systems have given rise to numerous mechanical aerators and agitators, including designs similar to those used in commercial sewage treatment plants. For example, devices have been designed to aerate the material by rotating paddle wheels or the like which operate to either beat air into the material while moving it in the reservoir or to at least partially throw the material into the air. Other designs have incorporated separate means for moving the material in the reservoir and have introduced air by pumping compressed air through permeable "air stones" positioned at the bottom of the reservoir. The air stones are adapted to break the air into bubbles which enter the waste material. Bubbles are preferred over a stream of air passing through the material because the ratio of surface area to volume is greater and enables the oxygen to be more easily dissolved in the material. The proper functioning of an aerobic system is, of course, dependent upon the quantity of dissolved oxygen that is present within the waste material. It is seen that more power would be consumed by injecting larger than necessary quantities of oxygen into the material and, therefore, economic considerations are important in the manner in which oxygen is introduced. Another important economic consideration involves the manner in which the material is moved around or circulated within the reservoir.

Prior induced aeration systems most often insert air under pressure into the waste mass which is being "broken up" simultaneously by agitation. As a result air becomes entrapped and bubbles form. However, because the air is under pressure and the liquid agitated, the bubbles formed are quite large. As a result they quickly rise to the surface and escape. This results in less than ideal sludge contact with the oxygen supply of the air. Thus, the amount of dissolved oxygen available for the aerobic bacteria is less then it might be if contact were prolonged.

A prior invention of one of the inventors (Blough), U.S. Pat. No. 3,778,233, relates to an improved device for aeration used primarily in confinement livestock operations to aerate sludge pits used in conjunction with such livestock operations. While that device works fine under the circumstances of confinement feeding operations for livestock, such as hogs, there are limitations with use of such a device in conjunction with septic tanks that are used for storing human waste.

One of the problems with sewage disposal plants, and septic tank plants are that often the disposal system finds itself "contaminated" with non-organic non-biodegradable waste materials such as band-aids, sanitary napkins, disposable diapers, condoms, and other material that people often discard into the lines of a sewage system. These adulterating materials can be drawn into the propeller of an aeration device such as that described in my previous U.S. Pat. No. 3,778,233. As a result, the propeller often will become entangled in these materials, and the materials will plug the air tube lines. As a result, aeration is not successfully achieved, and at best the sludge material is simply generally stirred or agitated by the propeller with little effect on biodegradation. There is, therefore, a continuing need for an improved aeration device of the general type disclosed in my previous U.S. Pat. No. 3,778,233, but of a design which is improved so that it can be used successfully for aeration in septic tanks that contain the above-referred to "contaminating" non-organic, non-biodegradable waste materials.

The development of such a device as now patented in Ser. No. 687,373, filed Apr. 18, 1991, now U.S. Pat. No. 5,194,144 would mean that septic tanks can be conveniently converted into aeration units so that aerobic bacteria may decompose the material within the septic tanks, such that it can be successfully used for uses such as yard fertilizer, etc.

A primary objective of the present invention is to provide an improved aeration process of the type generally described in the above patent so that it can be used for successful vacuum aeration of septic tanks to provide low pressure microbubbles which are retained for longer hold times in a septic tank.

Another objective of the present invention is to provide an aeration method which provides ultra fine bubbles under equilibrium pressure with the liquid media for aeration of septic material, so that they do not rapidly rise to the surface and exit the tank.

An even further objective of the present invention is to provide an aeration method which will keep the dissolved oxygen content in septic tanks between 6 ppm and 10 ppm at all times to allow immediate conversation of all sizes of organic material particles by aerobic bacteria.

An even further objective of the present invention is to provide an aeration method which allows a home septic tank to be inexpensively converted into an aeration unit for decomposition of human organic waste material.

The method and means of accomplishing these as well as other objectives of the invention will become apparent from the detailed description of the invention which follows hereinafter.

SUMMARY OF THE INVENTION

An improved aeration method for septic tanks is provided. It may use an aeration device that has an elongated shaft having upper and lower ends. In operational position, the upper end of the elongated shaft is positioned above the sewage level in the septic tank. Power means is associated with the upper end for rotation of the shaft. The shaft has a concentrically positioned air tube for drawing ambient air, as apposed to pressurized air from the upper end downwardly to the lower end. The lower end has an associated propeller. The ambient air at atmospheric pressure is drawn down through an orifice and expands into a larger chamber or zone to the end of the air tube with air holes to allow free escape of air bubbles into agitated waste material to aerate the same. The air since it is at atmospheric pressure does not expand as fast, and in fact due to the movement into a larger chamber is at reduced air pressure when the bubbles form. They are therefore smaller in size and have an equilibrium pressure with the sludge resulting in the fine air bubbles, readily dispersed which have a long hold time to interact with the aerobic organisms to enhance biodegradation.

BRIEF DESCRIPTION OF THE DRAWINGS

FIG. 1 is a perspective view of a septic tank in conjunction with a fertilizer holding tank, with the septic tank being used with an aeration device for practice of the present invention.

FIG. 2 is a sectional view through a septic tank showing the directional flow of materials when using the aeration method of the present invention.

FIG. 3 is an elevated view in partial section of an aeration device for practice the present invention.

FIG. 4 is a sectional view along line 4—4 of FIG. 3 showing the concentric relationship of the air tube, guard tube, and the bushing mounts for the associated motor for use in practicing the method.

FIG. 5 shows an end view along line 5—5 of FIG. 4, showing the detail of the propeller bushing and the mounting of the propeller on the rotatable shaft of an aeration device for practice of the method.

DETAILED DESCRIPTION OF THE INVENTION

Looking first at FIG. 1, it shows a conventional septic tank 10 fluidly connected via pipe 12 to associated fertilizer holding tank 14. In addition, septic tank 10 has a sewage inlet line 16. Sewage is filling tank 10 up to the level represented by line 18. An aeration device for practice of the present invention is represented in FIG. 1 at 20.

The details of the aeration device 20 for practice of the present invention are shown in FIGS. 3, 4 and 5. The device 20 can be used in conjunction with an electric timer 22 which is electrically connected to the aeration device on/off switch 24 via electrical wires 26 and 28. Timer 22 has an electrically associated on/off light 30. In addition the device has an associated air filter 32 to allow ambient air to be drawn into the aeration device. The aeration device 20 is comprised of an electric motor 34 having an output motor shaft 36 which is connected to an elongated shaft 38 such that shaft 38 will rotate with motor shaft 36. Motor 34 is mounted in casing 40 via bushings 42. Bushings 42 holds motor 34 in a slightly elevated position on casing 40 to allow free air flow along the lines of directional arrows 44 and 46. At the lower end of shaft 38 is an axial thrust propeller 48. Thus, operation of the motor 34 rotates the shaft 38 and propeller 48 within the sludge material, moving it around the horizontal flow path indicated by directional arrows 50 of FIG. 2.

In addition to light 30, the unit may also have an audible indicator 31. This horn 31 is electrically connected to motor 34 to read the amperage of motor 34. A microprocessor (not depicted) records the starting amperage and the steady state amperage, after water is evacuated from tube 52. Any change from the steady state condition is sensed and an alarm from horn 31 is actuated to warn the operator that for some reason the unit needs to be checked. This assures that at all times during operation, successful aeration is occurring.

The same sensing of change in steady state operation may be accomplished by other sensors. For example, one could use a light source, a mechanical sensor such as a thermocouple, or a sensor source to sense the water level in tube 52 for steady state conditions and to sense any change away from steady state.

Concentrically positioned around shaft 38 is an elongated hollow air tube 52. Thus, when propeller 48 is rotating, atmospheric pressure air is drawn along the lines indicated by directional arrows 44 and 46 into the space between shaft 38 and air tube 52 and flows downwardly as indicated by arrows 54 and 56. The air expands as it flows from the small space between shaft 38 and air tube 52 into the larger chamber as indicated at arrows 54 and 56. At the interface between rotating propeller 48 and the downwardly moving air 54 and 56, an extreme amount of agitation and disruption occurs such that the air is pulled through air holes 60 in bushing 58 into the sewage material and septic tank 10 in the form of extremely small air bubbles. Because the air is initially at atmospheric pressure and then expands, the bubbles are very small and not pressurized. This provides the maximum amount of aeration since the smaller the bubbles and the less air pressure the more the exposure of sludge material to the oxygen since they are held longer in the sludge. Generally, with the device of this invention the dissolved oxygen content in the septic tank can be kept between 6 ppm and 10 ppm at all times, which is sufficient to convert immediately all soluble organic material into digested waste material suitable for transfer to hold tank 14 and ultimate use as a fertilizer material which contains nitrates and phosphates and extremely fine particles of non-biodegradable solids.

As earlier indicated, forced air compressors insert air into water under pressure. This results in high pressure bubbles 4.2 mm diameter and larger. These large bubbles rise rapidly to the water surface which reduces lateral oxygen transfer efficiency due to the short entrainment time. The vacuum microbubble process, here practiced, reduces bubble size, internal bubble gas pressure, increases surface to volume gas water transfer area, and keeps the small bubble suspended for longer entrainment. As a result there is greater lateral oxygen transfer time.

Atmospheric air (250 cu ft per 24 hours with continuous run time) is pulled through a 2" diameter plastic tube column and drawn through a small orifice into an area of reduced pressure created by the withdrawn water vacuum effect. The larger vacant area causes the air drawn through the orifice to expand due to the lower pressure according to the Gas Law $V1P1=V2P2$ at constant temperature. When this negative pressure air is pulled into the water vortex, the water collapses around the reduced pressure air and the surface tension generates a "microbubble" with an average size of 0.25 mm (range of less than 0.1 mm to 1 mm) being dispersed throughout the medium. These dispersed condensed microbubbles remain suspended for prolonged time periods and slowly rise to the surface over several hours of time (10–12 hours). This prolonged entrainment time due to equilibrium conditions allows increased lateral oxygen transfer to replace fluid dissolved oxygen (DO) used by aerobic bacterial digestion of organic matter (BOD, Biological Oxygen Demand).

Tests, performed on a 750 gallon septic tank which received 400 gallons of 220 ppm BOD per day over a 118 day test run, using the device here depicted to perform the method here described, reduced BOD values to an average of 56 ppm within the 24 hour testing period. One sample dumped 400 gallons of 660 ppm BOD wastewater that was reduced to 70 ppm BOD effluent in the 24 hour period. This 90% reduction reflected a 24 hour conversion of 2.229 lbs of BOD to 0.236 lbs of BOD. At two pounds of oxygen used per pound of BOD, 1.993 pounds of BOD used 3.986 pounds of oxygen. The aerator pulled 4.12 pounds of oxygen in this time period and the bacteria used 3.986 pounds of oxygen which represents a 96/7% oxygen transfer efficiency (OTE) from suspended gas bubbles to DO to metabolic activity. Existing air compressor systems have an OTE of only 10% for volumes pumped at 2500 cu ft per minute through a 24 hour time period.

This low pressure microbubble process generates millions of microbubbles with a large surface to volume ratio for high OTE. With the optimum conditions of high oxygen, waste matter for food, and an aerobic bacterial population, metabolism and growth will proceed at an exponential rate maximizing waste matter oxidation. When waste matter is limited, bacteria consume the necessary oxygen and microbubbles are retained in reserve to handle fluctuating waste matter levels. This process maintains a natural DO saturation from air transfer.

Photographic evaluations of liquid entrained microbubbles used for aerobic wastewater digestion are based on the following: 0.25 mm average bubble size, a measured population of 103 million microbubbles per cubic foot of liquid, a combined air/water surface to volume of 283 square feet per cubic foot of liquid. The total microbubble volume was calculated as 311 cubic feet per day with 0.0175 lbs of oxygen per cubic foot of air at sea level. This produced (0.0175×311 cu ft) 5.44 lbs of oxygen available for DO replacement per day. This compares to the oxygen demand satisfied for the 660 ppm BOD load digested to 70 ppm BOD in a 24 hour period.

The microbubble process forms reduced air pressure small diameter bubbles that remain water suspended for prolonged time periods. This population of microbubbles provide replacement molecules for the DO assimilated by the aerobic bacteria during metabolic breakdown of organic matter into carbon dioxide and water waste. No odor, low suspended solids, reduced BOD, and low coliform counts result.

Turning back to the construction of the aeration device for practice of the present invention, air tube 52 allows air to be pulled downwardly when propeller 48 turns. Air tube 52 extends downwardly slightly longer than the terminus of propeller 48. In actual operation, bushing 58 with air holes 60, coacts with the end of air tube 52 to prevent contaminating foreign materials which are non-biodegradable plastic materials, synthetic rubber materials, etc. from interfering with the small bubble action of propeller 48. As illustrated in FIG. 5, propeller 48 is mounted to the end of shaft 38 via propeller bushing 58. Propeller bushing 58 has air holes 60 to allow air to be forced into the sewage material.

In actual operation the unit is operated by timer 22 to run on an on/off cycle as recommended, depending upon the conditions in septic tank 10. Generally for household septic tanks on/off times of ten minutes on and twenty minutes off are suitable operational periods. When the unit is energized and electric motor 34 is operating, the unit operated in the following manner. Motor 34 causes motor shaft 36 to rotate. Since motor shaft 36 is connectively coupled to shaft 38 it likewise rotates. Rotation of shaft 38 causes propeller 48 to rotate. Air or oxygen flows through the gaps caused by bushings 42 via directional arrows 44 and 46 down into the space of air tube 52, concentrically positioned around shaft 38. The air or oxygen flow moves downward to the backside of propeller 48. At propeller 48 the moving thrust of the downwardly moving air interfaces with the sludge material, and the high degree of agitation results in a fine mist of air bubbles being dispersed throughout sludge in septic tank 10. Material in septic tank 10 generally moves along the lines indicated in directional arrows 50.

During operation the coaction of the location of the propeller with regard to the end of the air tube, and the action of bushing 58 in combination with air holes 60 coact to prevent adulterating or contaminating material from being drawn into propeller 48 and from plugging the air lines associated with air tube 52. As a result, non-organic waste adulterants such as non-digestible plastic or rubber materials that might be present in septic tank 10 do not interfere at all with operation of the unit which freely operated regardless of these materials to dispense micro-sized bubbles into the sludge and to freely circulate and agitate the sludge material to maximize the operation of aerobic bacteria.

It therefore can be seen that the invention accomplishes at least all of its stated objectives. It goes without saying, certain modifications to the construction and operation can be made and still employ the basic concept and operational features of the invention. It is intended that those modifications be included within the claimed invention as hereinafter defined. For example other constructions of aeration devices may be used to pull in normal atmospheric air, reduce the pressure by passing through an orifice into an expansion chamber and then draw the air into agitated sludge to interact with the aerobic organisms.

What is claimed is:

1. A method of simultaneous aeration and agitation of sludge, said method comprising;

moving atmospheric pressure air through a confined elongated zone into a larger zone of reduced air pressure which contains sludge;

dispersing extremely small reduced pressure microbubbles of an average size of about 0.25 mm into the sludge while simultaneously agitating said sludge; and maintaining the dispersed microbubbles in said sludge to increase lateral oxygen transfer to replace oxygen used by aerobic bacteria.

2. The method of claim 1 wherein the microbubbles are maintained within the sludge for up to ten to twelve hours.

3. The method of claim 1 wherein the microbubbles are produced by drawing atmospheric pressure air through an orifice into an expansion chamber and then into said sludge.

4. The method of claim 3 wherein said microbubbles are produced and dispersed by means of an air tube for drawing ambient air into a propeller agitation means rotating at high speed in said sludge.

* * * * *